(12) United States Patent
Chang

(10) Patent No.: US 11,389,017 B2
(45) Date of Patent: Jul. 19, 2022

(54) HEIGHT ADJUSTMENT PILLOW HAVING HANDLE MOUNTED TO LOWER PART THEREOF

(71) Applicant: MOTEX PRODUCTS CO., LTD., Bucheon-si (KR)

(72) Inventor: Sang Bin Chang, Seoul (KR)

(73) Assignee: MOTEX PRODUCTS CO., LTD.

( * ) Notice: Subject to any disclaimer, the term of this patent is extended or adjusted under 35 U.S.C. 154(b) by 451 days.

(21) Appl. No.: 16/677,895

(22) Filed: Nov. 8, 2019

(65) Prior Publication Data
US 2020/0069087 A1    Mar. 5, 2020

Related U.S. Application Data

(63) Continuation of application No. PCT/KR2018/005065, filed on May 2, 2018.

(30) Foreign Application Priority Data

May 10, 2017    (KR) .......................... 10-2017-0058321

(51) Int. Cl.
    *A47G 9/10*      (2006.01)
    *F16H 25/12*     (2006.01)
    *F16H 25/18*     (2006.01)

(52) U.S. Cl.
    CPC ......... *A47G 9/1009* (2013.01); *F16H 25/125* (2013.01); *F16H 25/183* (2013.01); *F16H 25/186* (2013.01)

(58) Field of Classification Search
CPC ... A47G 9/1009; F16H 25/125; F16H 25/183; F16H 25/186
See application file for complete search history.

(56) References Cited

U.S. PATENT DOCUMENTS

| 5,353,457 | A | * | 10/1994 | Chu | ...................... | A47G 9/1009 5/643 |
| 9,138,072 | B1 | * | 9/2015 | Sanders | ............... | A47G 9/0253 |

(Continued)

FOREIGN PATENT DOCUMENTS

| CN | 201822426 U | 5/2011 |
| CN | 202218765 U | 5/2012 |

(Continued)

OTHER PUBLICATIONS

Extended European Search Report (EP 18797933.1), EPO, dated Nov. 27, 2020.

(Continued)

*Primary Examiner* — Terence Boes
(74) *Attorney, Agent, or Firm* — Park & Associates IP Law, P.C.

(57) ABSTRACT

The present invention provides a height adjustment pillow including a lifting device adjusting the height of an upper member with respect to a lower member, the lifting device comprising: a drive shaft passing through the lower member with a lower end part thereof protruding from a lower part of the lower member and having a manipulation handle provided in the lower end part; at least one or more rotation members mounted on the lower member to be rotatable relative to upward and downward directional shafts thereof; a power train transmitting a rotational force of the drive shaft to the rotation members; and lifting operation equipment converting a rotational movement of the rotation member into a rectilinear movement of the upward and downward directions so as to lift and lower the upper member.

4 Claims, 13 Drawing Sheets

(56) References Cited

U.S. PATENT DOCUMENTS

| | | | |
|---|---|---|---|
| 9,538,869 | B1 | 1/2017 | Chang |
| 2016/0367052 | A1* | 12/2016 | Chang .................. A47G 9/10 |
| 2019/0150626 | A1* | 5/2019 | Huang ................ A47C 20/041 |
| 2019/0343718 | A1* | 11/2019 | Shin .................... A47G 9/1045 |

FOREIGN PATENT DOCUMENTS

| | | |
|---|---|---|
| CN | 204950319 U | 1/2016 |
| CN | 106170230 A | 11/2016 |
| JP | 31-54310 U | 10/2009 |
| JP | 2012-143412 A | 8/2012 |
| JP | 2017-511724 A | 4/2017 |
| KR | 10-2004-0009977 A | 1/2004 |
| KR | 20-2009-0005098 U | 5/2009 |
| KR | 10-2010-0117485 A | 11/2010 |
| KR | 20-0461416 Y1 | 7/2012 |
| KR | 10-1520430 B1 | 5/2015 |
| KR | 10-1607997 B1 | 4/2016 |
| KR | 10-1645636 B1 | 8/2016 |
| KR | 20-2016-0004049 U | 11/2016 |
| WO | 02/34093 A1 | 5/2002 |
| WO | 2016/182222 A1 | 11/2016 |

OTHER PUBLICATIONS

Japan Office Action (JP 2020-512348), JPO, dated Dec. 1, 2020.
Korean Office Action (KR 10-2017-0058321), KIPO, dated Mar. 6, 2018.
Korean Notice of Allowance (KR 10-2017-0058321), KIPO, dated Apr. 23, 2018.
International Search Report (PCT/KR2018/005065), WIPO, dated Aug. 9, 2018.
Japanese Office Action (JP 2020-512348), JPO, dated Jun. 22, 2021.
Chinese Office Action (CN 201880029970.0), CNIPA, dated Jun. 2, 2020.

* cited by examiner

HEIGHT ADJUSTMENT PILLOW HAVING HANDLE MOUNTED TO LOWER PART THEREOF

REFERENCE TO RELATED APPLICATIONS

This is a continuation of International Patent Application PCT/KR2018/005065 filed on May 2, 2018, which designates the U. S. and claims priority of Korean Patent Application No. 10-2017-0058321 filed on May 10, 2017, the entire contents of which are incorporated herein by reference.

FIELD OF THE INVENTION

The present invention relates to a pillow used to support a user's head when lying down.

BACKGROUND OF THE INVENTION

A height-adjustable pillow that a user can adjust the height thereof is disclosed in Chinese Utility Model Registration Publication No. 201822426U and Korean Patent Nos. 10-1520430B1, 10-1607997B1, and 10-1645636B1.

The height-adjustable pillow includes a pillow body and a pillow cushion provided on the pillow body. The pillow body includes an upper member, a lower member, and a lifting device. The pillow cushion is arranged on an upper side of the upper member, and the lifting device is configured to move the upper member in upward and downward directions. Accordingly, by adjusting the height of the upper member relative to the lower member, a user can adjust a pillow height to a level that induces a comfortable or correct posture.

However, since such a height-adjustable pillow is required to be manipulated by a user, the manipulation handle of the lifting device (see a reference numeral H of FIGS. 1A and 1B) which is required to be exposed to the outside is arranged on a circumferential part of a pillow body such as a front or a rear of the pillow body. Accordingly, the arranged area of the manipulation handle cannot be covered with the pillow cushion. Because of this, when an impact is applied to the side of the manipulation handle, the applied impact is inevitably transmitted to the pillow body. Of course, the user may also be hurt when hitting the manipulation handle while using the pillow.

In addition, the height-adjustable pillow described above is covered with a pillow cover, which is normally made of fabric. To cover the manipulation handle with the pillow cover to allow the manipulation handle to be exposed to the outside, a portion of the pillow cover is required to be cut out or cut off so that the pillow cover has a hole or a gap formed therein to pass the manipulation handle therethrough. Accordingly, the height-adjustable pillow described above is required to form the hole or the gap for exposing the manipulation handle, and has process inconvenience in that finishing touches are required to be performed at the edges of the hole or the gap to prevent deterioration and damage thereof.

Furthermore, since the manipulation handle is configured to rotate relative to a shaft of a horizontal direction orthogonal to upward and downward directions, the configuration of lifting and lowering the upper member by transmitting a rotational force of the manipulation handle to the upper member is complicated.

Meanwhile, the height-adjustable pillow described above has rigidity to protect the lifting device arranged between the lower member and the upper member from the outside. When the height-adjustable pillow is used on an uneven place such as a raised floor, the pillow is tilted to either side as illustrated in FIG. 1A or keeps rocking as illustrated in FIG. 1B. Accordingly, the height adjustment pillow has the limitation in use that it can be used stably and conveniently only on a flat place.

In addition, whenever a user changes posture by lying on his or her side after lying down while using the pillow, the user is required to manually adjust the height of the pillow to be suitable for the changed posture. For example, when changing from a supine posture to a side lying posture, a pillow height is required to be increased, but in the opposite case, the pillow height is required to be decreased.

SUMMARY OF THE INVENTION

The present invention is intended to provide a height adjustment pillow which is more advantageous in terms of simplifying height adjustment configuration, preventing damage caused by external forces such as impact, improving the efficiency of manufacturing, or improving convenience.

In order to accomplish the above objectives, the present invention provides a height adjustment pillow including: a left body and a right body arranged at an interval so as to be spaced apart from each other; and an elastic middle body connecting the left body with the right body therebetween and capable of being elastically transformed, wherein at least any one of the left body and the right body comprises: a lower member; an upper member arranged on the lower member; and a lifting device adjusting a height of the upper member with respect to the lower member by moving the upper member up and down, wherein the lifting device comprises: a drive shaft arranged in the upward and downward directions by passing through the lower member with a lower end part thereof protruding from a lower part of the lower member and having a manipulation handle provided in the protruding lower end part; at least one or more rotation members mounted to an upper part of the lower member to be rotatable relative to upward and downward directional shafts thereof in adjacent areas of the drive shaft; a power train transmitting a rotational force of the drive shaft to the rotation members; and a lifting operation equipment converting a rotational movement of the rotation member into a rectilinear movement of the upward and downward directions proportional to an rotation angle of the rotation member with respect to the upper member so as to lift and lower the upper member, wherein a receiving groove part is provided in the lower part of the lower member to receive the lower end part and the manipulation handle.

The power train may be a geared power train comprising a drive gear mounted to the drive shaft and a driven gear mounted to the same shaft as a shaft of the rotation member, wherein the teeth number of the drive gear may be smaller than the teeth number of the driven gear.

The power train further may include an idler gear provided between the drive gear and the driven gear to be engaged with the drive gear and the driven gear, wherein the teeth number of the idler gear may be larger than the teeth number of the drive gear and smaller than the teeth number of the driven gear.

The height adjustment pillow according to the embodiment of the present invention may further include: a height indication device indicating the height of the upper member according to a rotational angle of the rotation member.

The height indication device may include: a first gear mounted to the same shaft as the shaft of the rotation member; a second gear mounted rotatably to the lower end part protruding from the lower part of the lower member, received in the receiving groove part, rotated by a rotational force of the first gear, and having the same pitch circle and gear teeth number as a pitch circle and a gear teeth number of the first gear; and an indication member mounted to the second gear and having an indication part to indicate the height of the upper member.

The lower member of the left body and the lower member of the right body may be provided with one or more female coupling parts in each of parts opposed to each other, and a male coupling part with which each of the female coupling part of the left body and the female coupling part of the right body is combined may be provided at each of a left end part and a right end part of the middle body.

The female coupling part may include an insertion groove part having: an entrance in which the female coupling part is combined with each of the male coupling parts; insertion passages extending from the entrance in the direction of the insertion of the male coupling part into the entrance; and holding surfaces extending in directions away from each other to opposite sides, respectively, from an end of each of the insertion passages and arranged at a side opposite to a side of the entrance.

The male coupling part may be inserted through the entrance into the insertion passages and include a hook part having: a pair of hook bodies arranged to be parallel to each other on opposite sides relative to the direction of the insertion of each of the pair of hook bodies into the insertion passage, and elastically accessing each other and restored to an initial state; anti-insertion bumps provided on the pair of hook bodies to restrict the depth of the insertion of the pair of hook bodies into the insertion passages by being held in the entrance; and hook heads provided at ends of the hook bodies to prevent the pair of hook bodies from being removed from the insertion groove part by being held in the holding surfaces.

The insertion groove part may have a reinforcement partition wall, each of an upper end and a lower end of which is connected to an inner wall of the insertion passage and partitioning the insertion passage into an area into which one of the pair of hook bodies is inserted and into an area into which the remaining one of the pair of hook bodies is inserted.

The insertion passage may include contact inner surfaces provided on opposite sides thereof and being in close contact with each of the pair of hook bodies elastically restored to the initial state thereof.

The middle body may be configured to be a plate having at least one opening at a center part thereof, and the lower surface of the middle body may be arranged to be positioned at the same height as the height of each of the lower surface of the left body and the lower surface of the right body. An upward and downward directional height of the middle body may be lower than the lowest height of each of the upper member of the left body and the upper member of the right body.

According to the embodiment of the present invention, the manipulation handle is mounted to the lower part of a pillow body (the left body, the right body). Accordingly, the upper part and the circumferential part of the pillow body can be entirely covered with a pillow cushion. Accordingly, the pillow body can be more securely protected from external impact, and a user can be more reliably prevented from being injured by hitting the pillow body. In addition, the upper part and the circumferential part of the pillow body can be easily covered with a pillow cover and the pillow cover can be efficiently manufactured.

According to the embodiment of the present invention, the manipulation handle is mounted to the lower part of each of the left body and the right body and the drive shaft is arranged in upward and downward directions. Accordingly, the structure of the power train can be more simplified compared to the structure of a power train in which the drive shaft is arranged in a horizontal direction.

Furthermore, the drive gear is configured to have gear teeth fewer than gear teeth of the driven gear. Accordingly, the manipulation handle can be easily manipulated with less force.

According to the embodiment of the present invention, the height adjustment pillow includes the left body and the right body arranged from side to side, and the elastic middle body connecting the left body with the right body therebetween. Accordingly, the elasticity (elastic transformation) of the middle body allows the height adjustment pillow to be stably and conveniently used even in an uneven place (a raised floor) without being tilted to one side or shaken repeatedly. (see FIGS. 11C and 11D)

Additionally, a lower surface of the middle body is located at the same height as the height of the lower surface of each of the left body and the right body. Accordingly, the height adjustment pillow can be used stably and conveniently even on a flat surface. (see FIGS. 11A and 11B)

According to the embodiment of the present invention, the height adjustment of the upper member of the left body and the height adjustment of the upper member of the right body are made independently (individually) by the lifting device. Accordingly, after the heights of the upper member of the left body and the upper member of the right body are adjusted to heights different from each other as desired or required, any one of the left body and the right body can be selectively used. (see FIG. 11B) For example, when lying down, the body at a relatively low position of the left body or the right body may be used, and when lying down and turning to the side, the body at a relatively high position of the left body or the right body may be used.

Of course, when the height adjustment pillow is used in an uneven floor, for example, when the left body is in a relatively high position and the right body is in a relatively low position, the upper member of the right body can be lifted to the same height as the height of the upper member of the left body before the height adjustment pillow is used. (see FIG. 11D)

In addition, according to the embodiment of the present invention, the height of the middle body of the upper member is lower than the lowest height of each of the left body and the right body. Accordingly, a pillow height lower than the height of each of the left body and the right body may be provided to a user.

According to the embodiment of the present invention, the female coupling part and the male coupling part are combined with each other by the anti-insertion bumps held in the entrance, contact force of each of the hook bodies with the contact inner surfaces, and the hook heads held by the holding surfaces. Accordingly, the left body, the right body, and the middle body can be maintained in a stable combination state without slight movement (a little movement due to loose coupling) and separation from each other.

DETAILED DESCRIPTION OF THE INVENTION

Hereinbelow, an exemplary embodiment of the present invention will be described with reference to the accompanying drawings.

Figure 1A:
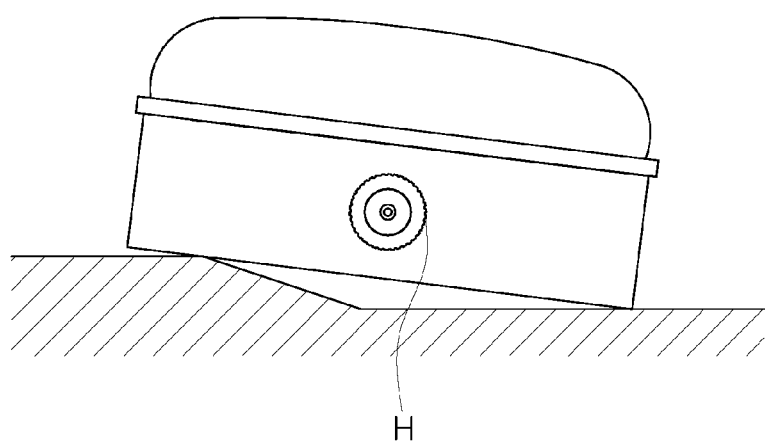
FIGS. 1A and 1B shows views illustrating problems of a height adjustment pillow according to a prior art.
Figure 1B:
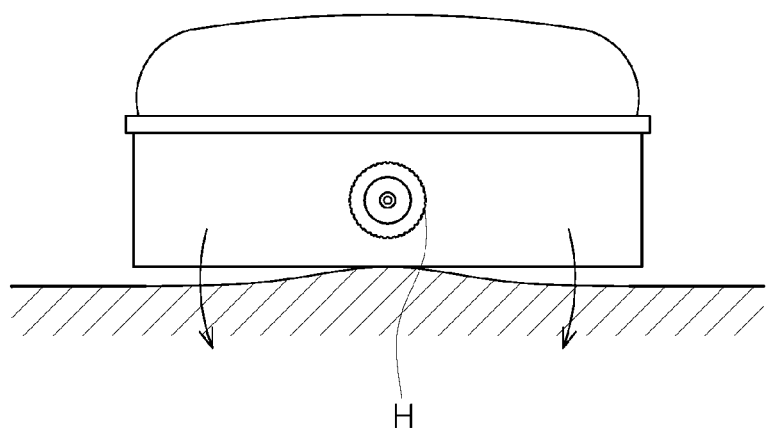
Figure 2:
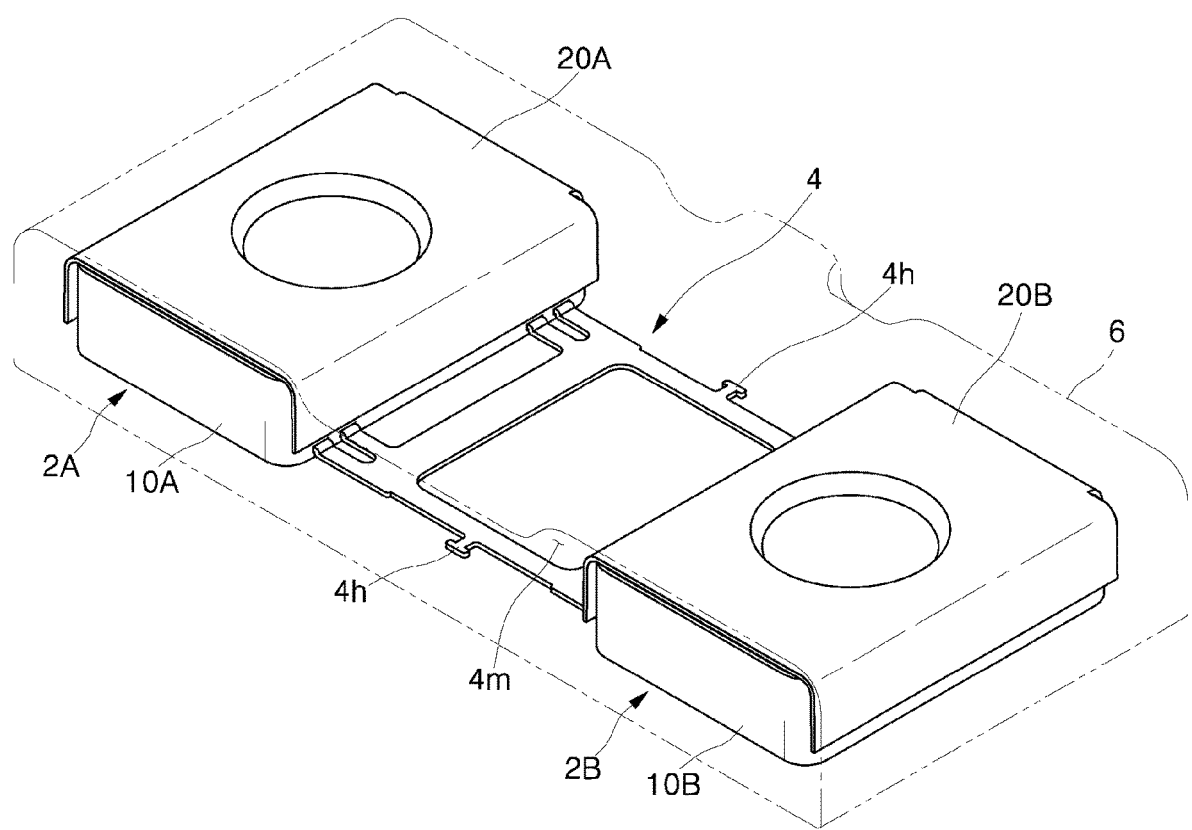
FIG. 2 is a perspective view illustrating a height adjustment pillow according to the embodiment of the present invention.

FIG. 2 is a perspective view illustrating a height adjustment pillow according to the embodiment of the present invention.

As illustrated in FIG. 2, the height adjustment pillow according to the embodiment of the present invention includes: a pillow base (see reference numerals 2A, 2B and 4 of FIG. 2) on a lower part thereof; a pillow cushion 6 arranged on an upper part of the pillow base; and a pillow cover (not shown) covering the pillow base and the pillow cushion 6. The pillow cover is made of fabric and may be formed to have a size to cover the pillow base and the pillow cushion 6.

Figure 3:
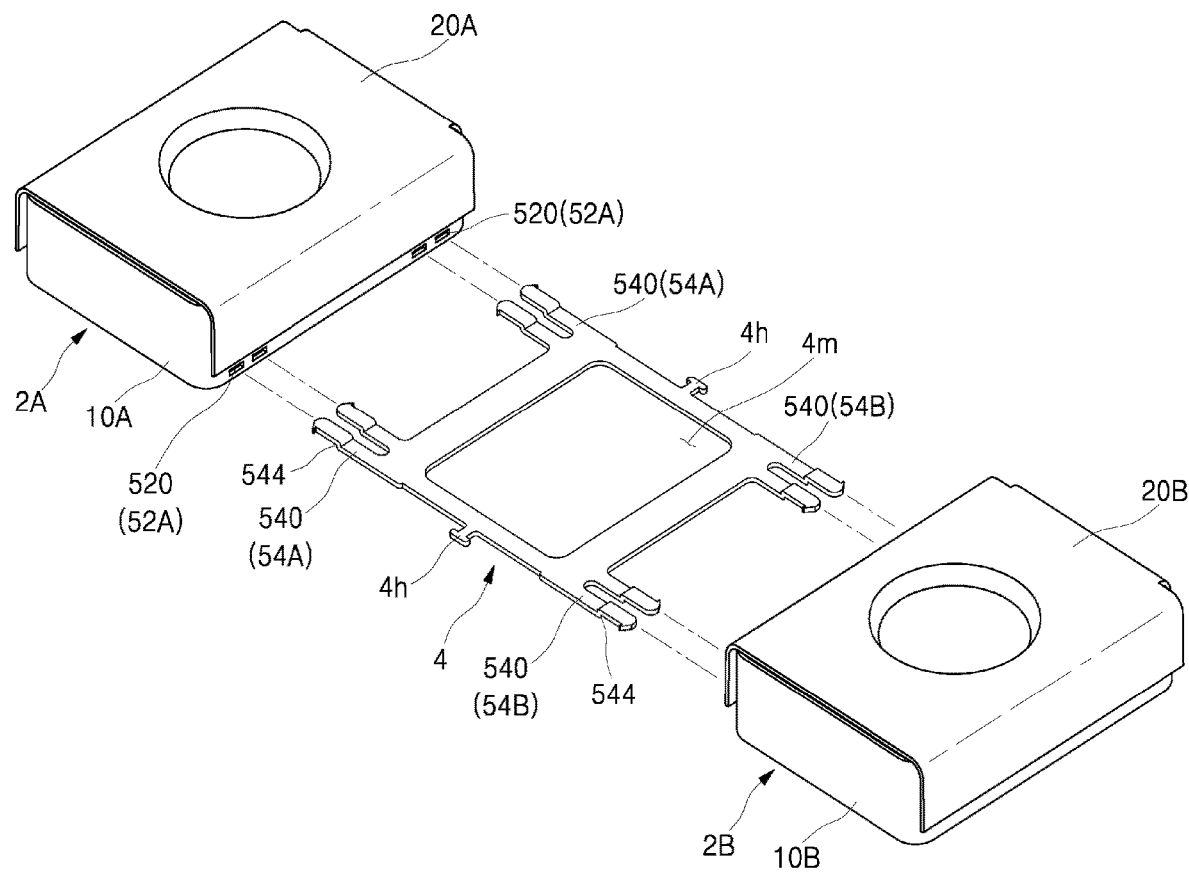
FIG. 3 is an exploded perspective view illustrating the pillow base of the height adjustment pillow according to the embodiment of the present invention.

FIG. 3 is an exploded perspective view illustrating the pillow base. Referring to FIGS. 2 and 3, the pillow base includes: a left pillow body 2A and a right pillow body 2B arranged at a predetermined interval to be spaced apart from each other in leftward and rightward directions; and the middle pillow body 4 connecting the left pillow body 2A with the right pillow body 2B.

Hereinafter, the left pillow body 2A, the right pillow body 2B, and the middle pillow body 4 will be referred to as a left body, a right body, and a middle body, respectively.

Figure 4:
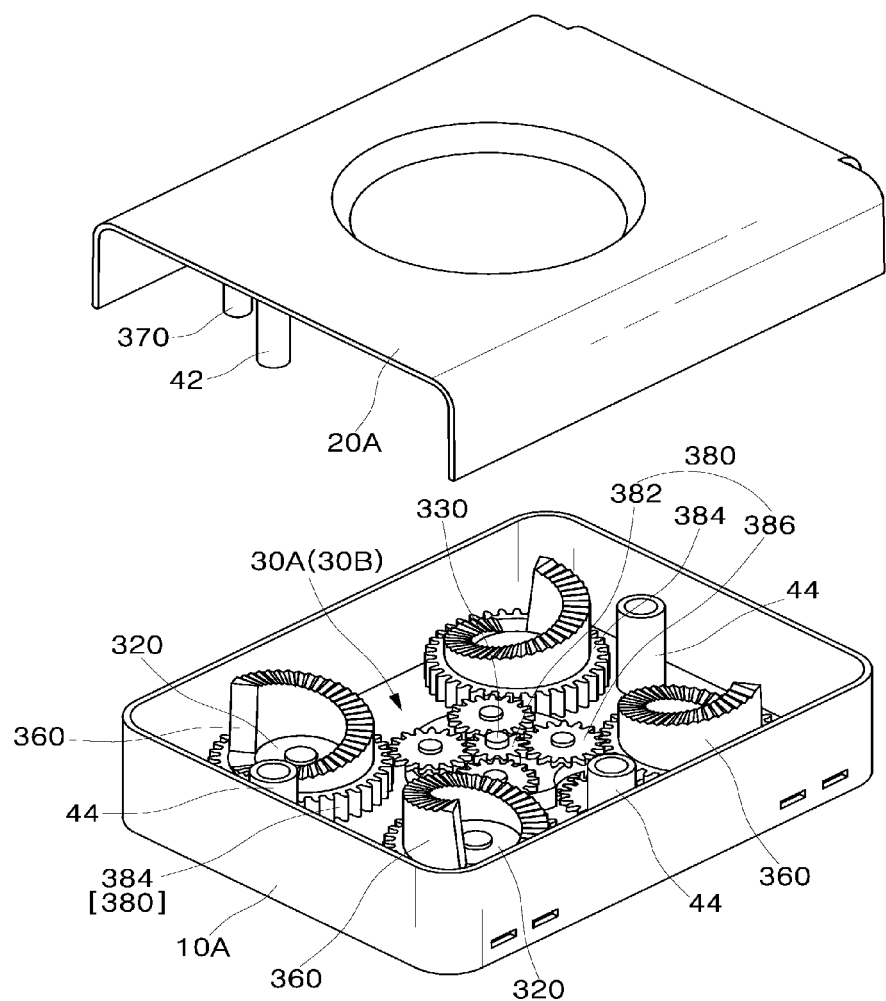
FIG. 4 is an exploded perspective view illustrating a left body (a left pillow body) of the pillow base illustrated in FIG. 3.

FIG. 4 is an exploded perspective view illustrating the left body 2A of the pillow base.

As illustrated in FIGS. 3 and 4, the left body 2A includes: a lower member 10A, an upper member 20A arranged at an upper side of the lower member 10A to move rectilinearly in the upward and downward directions; a lifting device 30A adjusting the height of the upper member 20A with respect to the lower member 10A by moving the upper member 20A in the upward and downward directions; and a guiding means (see reference numerals 42 and 44 of FIG. 4) guiding the movement of the upper member 20A by the lifting device 30A.

In addition, the right body 2B also includes: a lower member 10B, an upper member 20B arranged at an upper side of a lower member 10B to move rectilinearly in the upward and downward directions; a lifting device 30B (see FIG. 4) adjusting the height of the upper member 20B with respect to the lower member 10B by moving the upper member 20B in the upward and downward directions; and a guiding means (see reference numerals 42 and 44 of FIG. 4) guiding the movement of the upper member 20B by the lifting device 30B.

The lower member 10A of the left body 2A is configured to have a shape of a box having at least an open portion of an upper part thereof. Particularly, the lower member 10A of the left body 2A includes a bottom plate and walls erected on the bottom plate along edges thereof. The lower member 10A of the left body 2A may have a rectangular structure.

The lower member 10A of the left body 2A and the lower member 10B of the right body 2B are configured to be the same or similar to each other. Accordingly, the description of the lower member 10B of the right body 2B will be omitted.

The upper member 20A of the left body 2A is formed to have a structure that covers the open upper part of the lower member 10A paired therewith. The upper member 20A of the left body 2A includes an upper plate opposing the bottom plate of the lower member 10A paired therewith. The upper member may further include side plates and a rear plate extending downward from the left and right and rear of the upper plate.

The upper member 20A of the left body 2A and the upper member 20B of the right body 2B are configured to be the same or similar to each other. Accordingly, the description of the upper member 20B of the right body 2B will be omitted.

Figure 5:
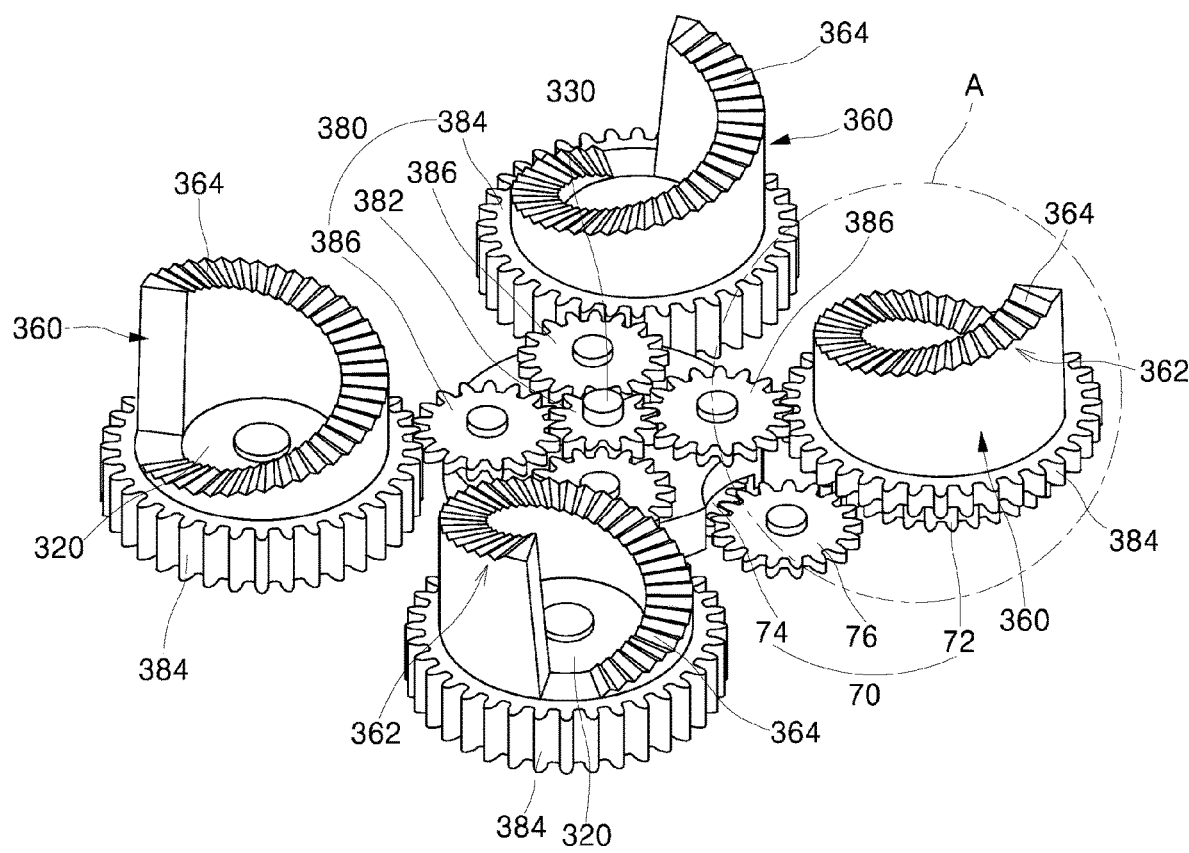
FIG. 5 is a perspective view illustrating a portion of a lifting device of the left body illustrated in FIG. 4.
Figure 6:
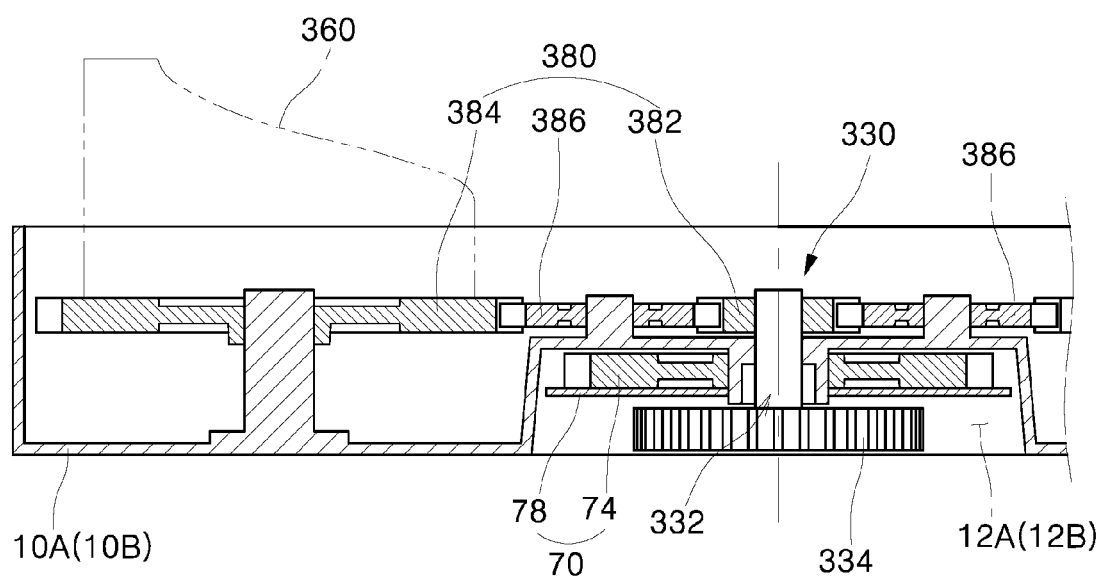
FIG. 6 is a sectional view illustrating a power train in relation to the left body illustrated in FIGS. 4 and 5.
Figure 7:
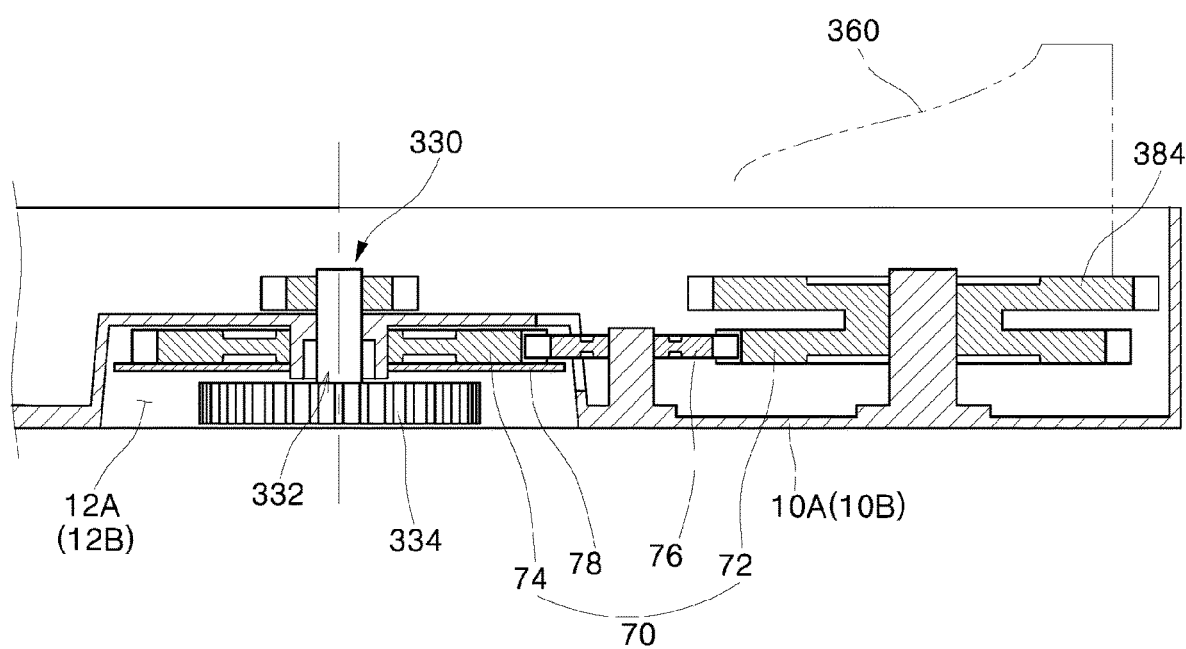
FIG. 7 is a sectional view illustrating a height indication device in relation to the left body illustrated in FIGS. 4 and 5.
Figure 8:
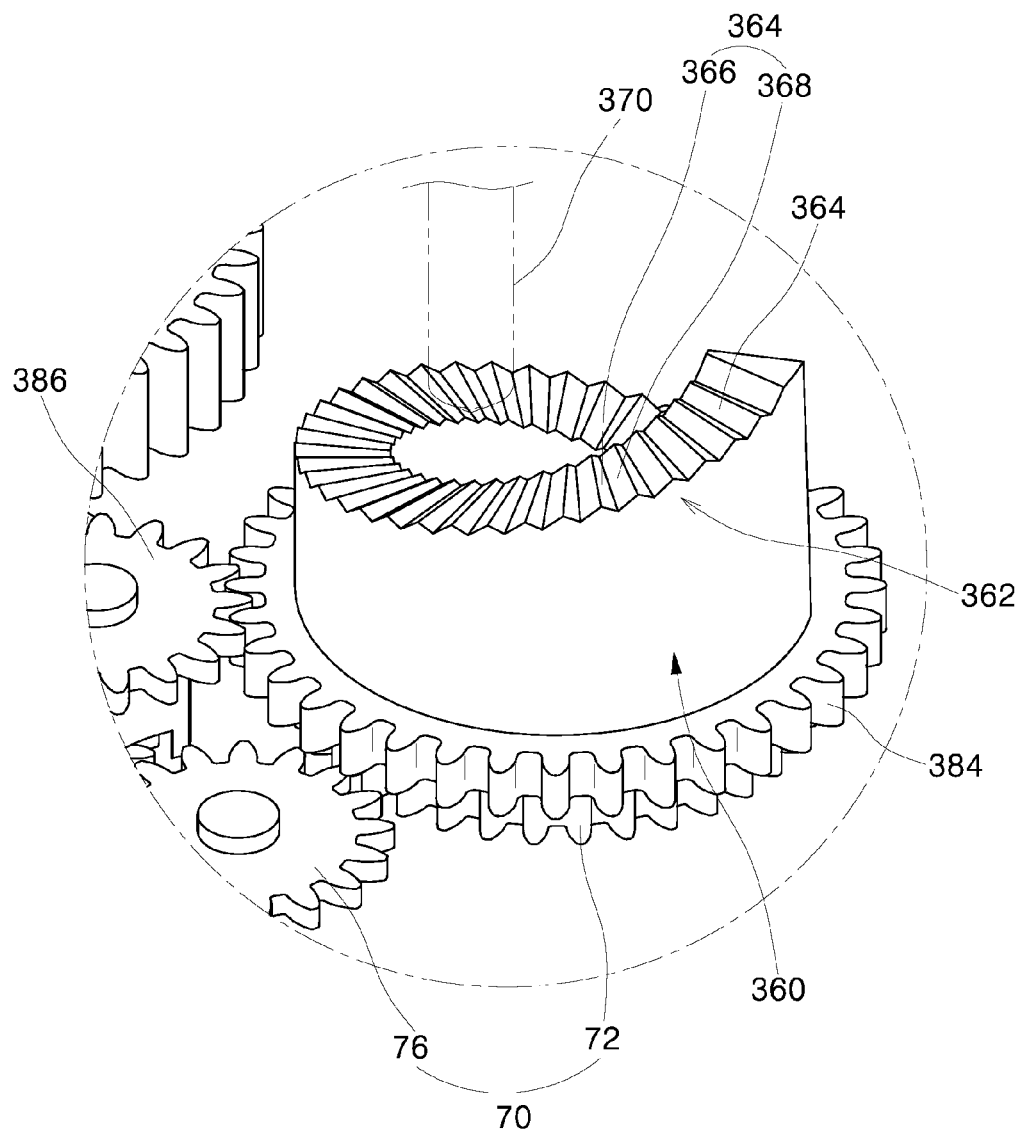
FIG. 8 is an enlarged view of an A part of FIG. 5.

FIG. 5 is a perspective view illustrating a portion of a lifting device 30A of the left body 2A illustrated in FIG. 4; FIGS. 6 and 7 are sectional views illustrating an inner configuration of the left body 2A including the lifting device 30A of the left body 2A; and FIG. 8 is an enlarged view of an A part of FIG. 5.

The lifting device 30A of the left body 2A may be configured as follows. This is mainly illustrated in FIGS. 4 to 8.

The lifting device 30A of the left body 2A includes: a drive shaft 330; a plurality of rotation members 320; a power train 380; and lifting operation equipment 360, 370.

The drive shaft 330 is a rotating shaft arranged in the upward and downward directions. The drive shaft 330 passes through the bottom plate of the lower member 10A in the upward and downward directions; an upper shaft part of the drive shaft protrudes upward from the bottom plate of the lower member 10A; and a lower end part 332 of the drive shaft protrudes downward from the lower part of the bottom plate of the lower member 10A. The manipulation handle 334 is provided in the protruding lower end part 332 and exposed to the outside to be manually manipulated by a user.

The rotation members 320 are arranged at intervals to be spaced apart from each other along a circumferential direction of the shaft part of the drive shaft 330 in the vicinity of the shaft part of the drive shaft 330 protruding upward from the bottom plate of the lower member 10A. Furthermore, each of the rotation members 320 is mounted to the bottom plate of the lower member 10A to rotate relative to an upward and downward directional shaft thereof parallel with the shaft part of the drive shaft 330 and is received into an inner space of the lower member 10A. For example, a circular plate may be applied to the rotation member 320.

The power train 380 functions to rotate the rotation members 320 by transmitting a rotational force of the drive shaft 330 generated when a user grabs and rotates the manipulation handle 334 by hand to the rotation members 320. The power train is a geared power train including a singular drive gear 382, a plurality of driven gears 384, and a plurality of idler gears 386. Spur gears are applied to the drive gear 382, the driven gears 384, and the idler gears 386.

The drive gear 382 is mounted to the drive shaft 330. Particularly, the drive gear is mounted to the shaft part of the drive shaft 330 protruding upward from the bottom plate of the lower member 10A and rotates with the drive shaft 330. Each of the driven gears 384 is mounted to the same shaft as a shaft of each of the rotation members 320 and rotates with the rotation member 320. The driven gear may be fitted into or integrated with a circumference of the rotation member 320, and may be arranged at, mounted to, or integrated with a lower part of the rotation member 320. Each of the idler gears 386 is arranged and mounted between the drive gear 382 and the driven gear 384 to be rotated while the idler gear is engaged with the drive gear 382 and the driven gear 384. Each of the driven gears 384 is configured to have the same pitch circle and the same gear teeth number. Each of the idler gears 386 is also configured to have the same pitch circle and the same gear teeth number.

To reduce force required by a user to rotate the manipulation handle 334, the pitch circle of the drive gear 382 is smaller than the pitch circle of each of the driven gear 384 and the idler gear 386, and the gear teeth number of the drive gear is smaller than the gear teeth number of each of the driven gear 384 and the idler gear 386. In addition, to further reduce the force required by the user to rotate the manipulation handle 334, the pitch circle of the idler gear 386 is larger than the pitch circle of the drive gear 382 but smaller than the pitch circle of the driven gear 384. The gear teeth number of the idler gear is larger than the gear teeth number of the drive gear 382 but smaller than the gear teeth number of the driven gear 384. Accordingly, the height adjustment pillow according to the embodiment of the present invention allows a user to conveniently manipulate the manipulation handle 334 with less force.

The lifting operation equipment 360, 370 functions to convert the rotational movement of the rotation member 320 into a rectilinear movement of the upward and downward directions proportional to a rotation angle of the rotation member 320 with respect to the upper member 20A so as to lift and lower the upper member 20A. The lifting operation equipment 360, 370 includes a lifting induction member 360 and a contact member 370 paired therewith in plural respectively.

Each of the lifting induction members 360 is provided to rotate with each of the rotation members 320 on the rotation member 320, and includes a sloping part 362 provided on the lifting induction member to slope upward in one direction (for example, counterclockwise) along a circumferential direction of a shaft of the rotation member 320 relative thereto. Furthermore, as illustrated in FIGS. 5 and 8, the lifting induction member 360 includes a plurality of step parts 364 provided on the sloping part 362 successively along a longitudinal direction of the sloping part 362 and arranged at heights different from each other. For reference, the lifting induction member 360 may be integrated with the rotation member 320.

Referring to FIGS. 4 and 8, each of the contact members 370 protrudes from a lower part of the upper plate of the upper member 20A toward an upper part of the lifting induction member 360 paired with the contact member, and a lower end of the contact member is arranged to contact with any one of the step parts 364 of the lifting induction member 360 according to a rotational angle of the lifting induction member 360 paired with the contact member. The lower end of the contact member 370 may be formed to have a round shape or a pointed shape, and the contact member may be integrated with the upper member 20A.

Referring to FIG. 8, the step parts 364 include step surfaces 366 and connection surfaces 368. First, the step surfaces 366 are arranged at predetermined intervals (may be the same interval) along the longitudinal direction of the sloping part 362 to be spaced apart from each other and are located at heights different from each other. Next, each of the connection surfaces 368 is formed as an inclined surface connecting each of the step surfaces 366 at the different heights to each other. Accordingly, while the contact member 370 lifts and lowers along the connection surfaces 368 during the rotation of the lifting induction member 360, the contact member is displaced from a present step surface 366 to another step surface adjacent thereto.

To prevent the contact member 370 from unintentionally lifting and lowering along the connection surfaces 368, each of the step surfaces 366 may be provided to slope downward in one direction (for example, counterclockwise) along the circumferential direction of the shaft of the rotation member 320 relative thereto, on which the lifting induction member 360 is provided.

Here, the number of each of the lifting induction members 360 and the contact members 370 paired with each other are described to be the same as the number of the rotation members 320 to convert the rotational movement into the rectilinear movement with respect to all of the rotation members 320. However, the number of each of the lifting induction members 360 and the contact members 370 paired with each other may be smaller than the number of the rotation members 320 to convert the rotational movement into the rectilinear movement with respect with a selected portion of the rotation members 320.

According to the lifting device 30A of the left body 2A configured as described above, the upper member 20A of the left body 2A is maintained at the lowest height when the contact member 370 is located on the step surface 366 of the step part 364 located at the lowest end thereof.

By rotating the drive shaft 330 in this state, the rotational force of the drive shaft 330 is transmitted to the rotation members 320 by the singular drive gear 382, the plurality of driven gears 384, and the plurality of idler gears 386, and the lifting induction member 360 is simultaneously rotated with the rotation members 320 by a predetermined angle clockwise relative to FIGS. 5 and 8. Then, the contact member 370 is located on a step surface of one step higher position adjacent to the step surface 366 at the lowest end while the contact member is lifted along the connection surface 368 connected to the step surface 366 at the lowest end. Accordingly, the upper member 20A is adjusted to one step higher height. Of course, when the drive shaft 330 is continuously rotated in the same direction, the contact member 370 is continuously moved up by the step parts 364, is located on a step surface 366 of the highest end (in this case, the upper member 20A is adjusted to the highest height), is again moved down, and is moved to the step surface of the lowest end.

Of course, when the drive shaft 330 is rotated in the opposite direction, the contact member 370 is located on a step surface 366 of a relatively low height, and the height of the upper member 20A is lowered.

The lifting device 30A of the left body 2A and the lifting device 30B of the right body 2B are configured to be the same or similar to each other. Accordingly, the description of the lifting device 30B of the right body 2B will be omitted.

In the lifting device 30A, 30B of each of the left body 2A and the right body 2B as described above, the manipulation handle 334 is mounted to each of lower parts of the left body 2A and the right body 2B, and the drive shaft 330 is arranged upward and downward. Accordingly, the structure of the power train 380 can be more simplified, and thus manufacturing, maintenance, and repair can be easily performed at low cost. That is, when the manipulation handle 334 is mounted to a circumferential part of each of the left body 2A and the right body 2B such as a front thereof and the drive shaft 330 is arranged in a horizontal direction orthogonal to the upward and downward directions, the required bevel gear is not required any longer, so the structure of the power train 380 can be simplified further.

The guiding means of the left body 2A may be configured as follows.

As illustrated in FIG. 4, the guiding means of the left body 2A may include: one or more guide pins 42 protruding downward from a lower part of the upper plate of the upper member 20A; and a pin insertion member 44 provided on the bottom plate of the lower member 10A and having a guide hole into which each of the guide pins 42 is inserted such that the guide pin moves slidably in the upward and downward directions parallel with the shaft part of the drive shaft 330. Depending on implementation conditions, the application positions of the guide pin 42 and the pin insertion member 44 may be interchanged.

The guiding means of the left body 2A and the guiding means of the right body 2B are configured to be the same or similar to each other. Accordingly, description of the guiding means of the right body 2B will be omitted.

In the left body 2A and the right body 2B, the lower part of the lower member 10A, 10B includes a receiving groove part 12A, 12B provided therein such that the lower end part 332 of the drive shaft 330 and the manipulation handle 334 are not exposed from the lower part of the lower member 10A, 10B to the outside and are received therein.

Figure 9:
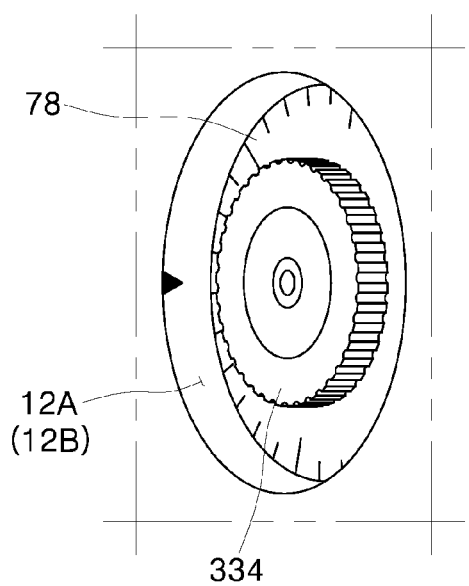
FIG. 9 is a perspective view illustrating a manipulation handle and surrounding configuration thereof illustrated in FIGS. 6 and 7.

A reference numeral 70 of FIGS. 7 to 9 refers to a height indication device. The height indication device 70 is applied to each of the left body 2A and the right body 2B and indicates a height of the upper member 20A, 20B according to a rotational angle of the rotation member 320 constituting the lifting device 30A, 30B of each of the left body 2A and the right body 2B. The height indication device 70 applied to each of the left body 2A and the right body 2B is configured to be the same or similar to each other.

The height indication device 70 applied to each of the left body 2A and the right body 2B includes: a first gear 72 mounted to the same shaft as a shaft of any selected one of the rotation members 320; a second gear 74 mounted rotatably to the lower end part 332 of the drive shaft 330 protruding from the lower part of the lower member 10A, 10B and received in the receiving groove part 12A, 12B, a third gear 76 provided between the first gear 72 and the second gear 74 to be rotated by being engaged with the first gear 72 and the second gear 74; and an indication member 78 mounted to the second gear 74 to rotate with the second gear 74.

Spur gears are applied to the first gear 72, the second gear 74, and the third gear 76. The first gear 72 and the second gear 74 are configured to have the same pitch circle and the gear teeth number. The pitch circle of the third gear 76 may be configured to be smaller than the pitch circle of each of the first gear 72 and the second gear 74, and the gear teeth number of the third gear may be configured to be smaller than the gear teeth number of each of the first gear 72 and the second gear 74. The first gear 72 may be provided integrally to a lower part of the driven gear 384 mounted to any selected one of the rotation members 320.

A communication opening is provided in the lower member 10A, 10B to arrange the third gear 76 between the first gear 72 and the second gear 74.

The indication member 78 is arranged in a lower part of the second gear 74. Accordingly, the indication member 78 may be placed between the manipulation handle 334 and the second gear 74. An indication part is provided in a lower part of the indication member 78 to indicate the height of the upper member 20A, 20B. As illustrated in FIG. 9, an indicator is provided in a part adjacent to the indication member 78, for example, in the receiving groove part 12A, 12B, and may be configured to indicate a height which the indication part of the indication member 78 indicates.

As illustrated in FIGS. 2 and 3, the middle body 4 connecting the left body 2A with the right body 2B therebetween is provided to be a metal elastic plate which can be elastically transformed.

Figure 11A:
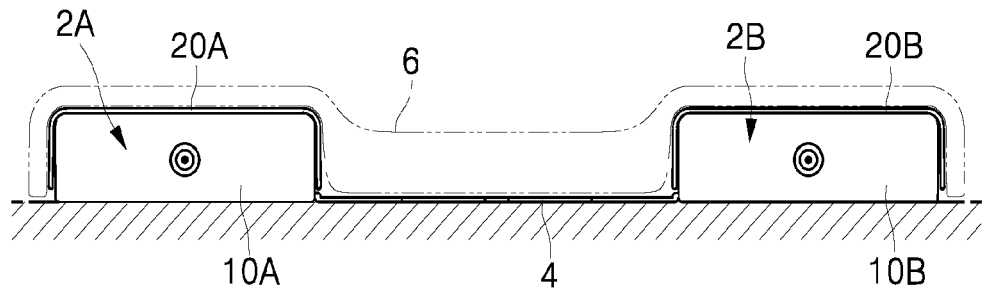
FIGS. 11A to 11D shows state views of use of the height adjustment pillow according to the embodiment of the present invention.
Figure 11B:
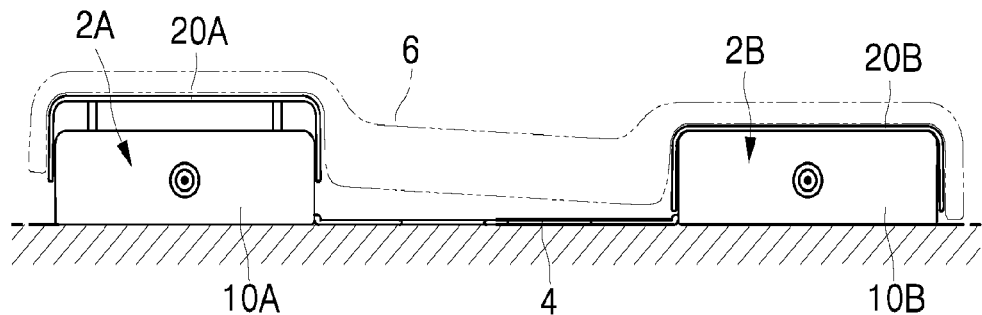
Figure 11C:
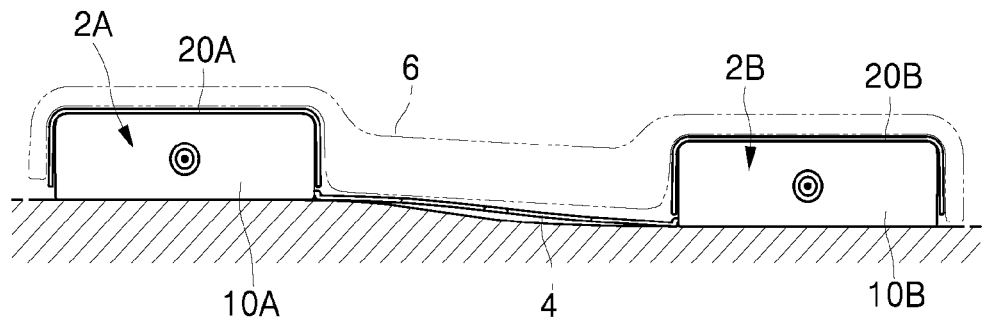
Figure 11D:
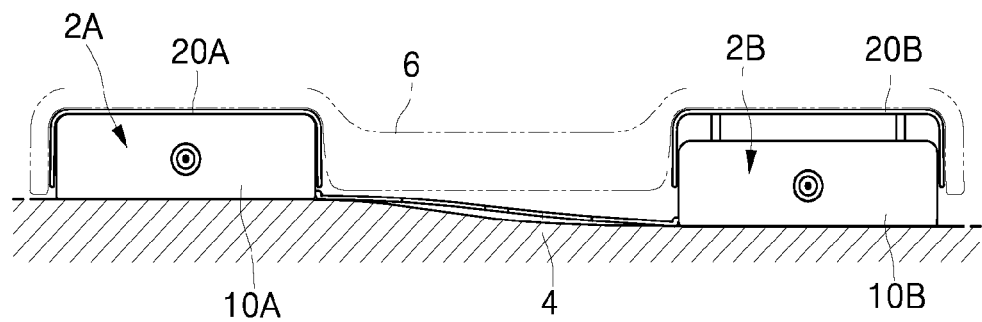

At least one opening 4m is provided in a center part of the middle body 4. Accordingly, the middle body 4 can be easily transformed by relatively small force (external force) in multiple directions, such as convexly bent or twisted upward or downward, and then restored to an initial shape thereof (see FIGS. 11C and 11D).

According to the middle body 4 of such an elastic plate, although the height adjustment pillow according to the embodiment of the present invention is placed on an uneven place (such as a raised floor), the pillow can be used stably and conveniently without tilting to one side or rocking repeatedly. (see FIGS. 11C and 11D)

Figure 10A:
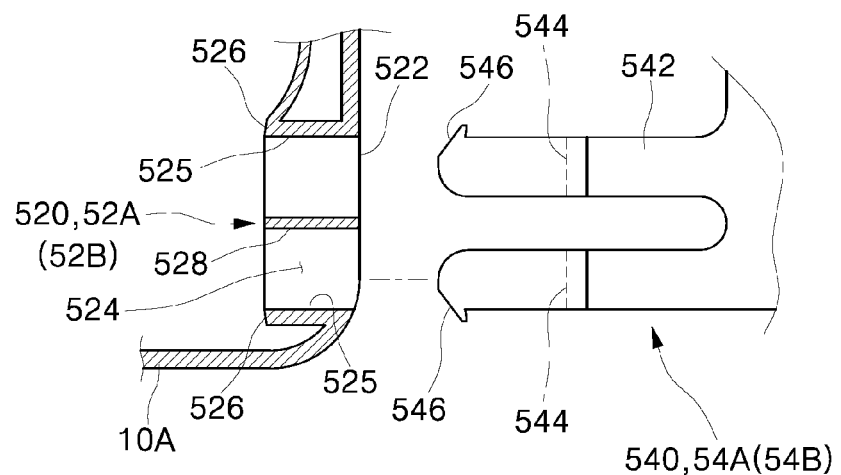
FIGS. 10A to 10C shows sectional views of the combining process of the left body and the middle body illustrated in FIG. 3.
Figure 10B:
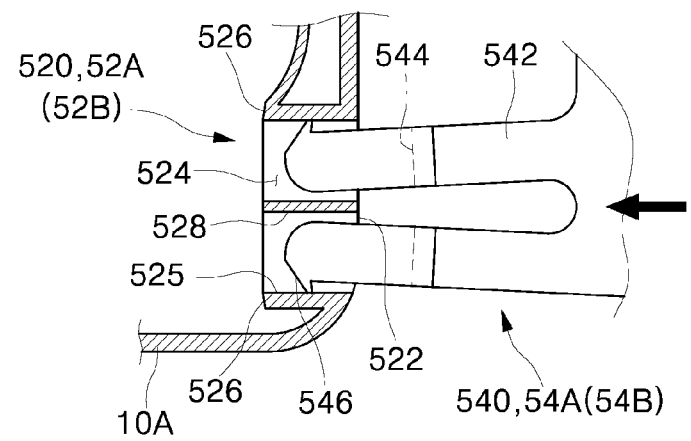
Figure 10C:
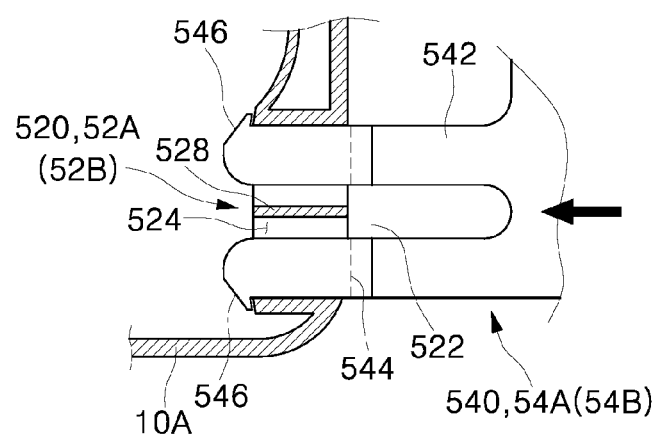

The combining process of the left body 2A and the middle body 4 is illustrated in FIGS. 10A to 10C.

Referring to FIGS. 3 and 10, a left end part of the middle body 4 is combined with the lower member 10A of the left body 2A by a left coupling means (see 52A and 54A of FIGS. 3, 10A, 10B and 10C), and a right end part of the middle body 4 is combined with the lower member 10B of the right body 2B by a right coupling means (see 52B and 54B of FIGS. 3, 10A, 10B and 10C). In the embodiment, at least one left coupling means and right coupling means may be provided.

The left coupling means includes a female coupling part 52A and a male coupling part 54A which are firmly coupled to each other by fitting. The right coupling means also includes a female coupling part 52B and a male coupling part 54B which are firmly coupled to each other by fitting.

Each of the female coupling part 52A of the left coupling means and the female coupling part 52B of the right coupling means is provided in walls (a right wall of the lower member 10A of the left body 2A and a left wall of the lower member 10B of the right body 2B) corresponding to portions in which the lower member 10A of the left body 2A is opposed to the lower member 10B of the right body 2B. Furthermore, each of the male coupling part 54A of the left coupling means and the male coupling part 54B of the right coupling means is provided in each of end parts of opposite sides of the middle body 4.

The female coupling part 52A and the male coupling part 54A of the left coupling means are configured as follows.

As illustrated in FIGS. 10A to 10C, the female coupling part 52A of the left coupling means includes an insertion groove part 520, and the male coupling part 54A of the left coupling means includes a hook part 540.

The insertion groove part 520 includes: an entrance 522 for introducing the hook part 540; insertion passages 524 extending from the entrance 522; and holding surfaces 526 extending in directions away from each other to opposite sides thereof, respectively, from an end (an end positioned at a side opposite to a side of the entrance 522) of each of the insertion passages 524. The entrance 522 is provided in a right wall constituting the lower member 10A of the left body 2A. The insertion passage 524 is provided to have a predetermined length (depth) from a right side to a left side, that is, in a direction in which the hook part 540 is inserted into the entrance 522, and is arranged with the holding surfaces 526 in the lower member 10A of the left body 2A. The insertion groove part 520 configured as described above may be configured to have an open structure in the end of the insertion passage 524 positioned at the side opposite to the side of the entrance 522.

The hook part 540 is inserted through the entrance 522 into the insertion passage 524 and includes: a pair of hook bodies 542 capable of being transformed elastically; anti-insertion bumps 544 held by the entrance 522 to restrict an insertion depth of each of the hook bodies 542 into the insertion passages 524; and hook heads 546 held by the holding surfaces 526 to prevent the hook bodies 542 inserted into the insertion passages 524 from being unintentionally separated from the holding surfaces. Each of the pair of hook bodies 542 is arranged to be parallel to each other on opposite sides with respect to the direction of the insertion thereof into each of the insertion passages 524. Each of the pair of hook bodies 542 protrudes integrally from the left end part of the middle body 4, and can be elastically transformed to access each other and then be restored to an initial state thereof. Each of the hook heads 546 is provided at an end of each of the hook bodies 542 to be held in each of the holding surfaces 526. Each of the anti-insertion bumps 544 is provided at a rear end part of each of the hook bodies 542 to be held in the entrance 522 when the hook head 546 is held in each of the holding surfaces 526. For reference, the anti-insertion bumps 544 may be formed by bending the hook bodies 542.

The contact inner surfaces 525 are provided at opposite inner walls of the insertion passage 524 relative to a direction of a length (a depth) of the insertion passage 524, and are in close contact with each of the pair of hook bodies 542 inserted into the insertion passage 524 and elastically restored to the initial state thereof.

The insertion groove part 520 has a reinforcement partition wall 528, each of an upper end and a lower end of which is connected integrally to upper and lower inner walls of the insertion passage 524 and partitioning the insertion passage 524 into an area into which one of the pair of hook bodies 542 is inserted and an area into which the remaining one of the pair of hook bodies is inserted. According to such a reinforcement partition wall 528, the insertion passage 524 of the insertion groove part 520 can be prevented from being deformed by external forces and the insertion groove part 520 can be structurally reinforced.

According to the left coupling means configured as described above, the female coupling part 52A and the male coupling part 54A are firmly combined with each other by the anti-insertion bumps 544 held in the entrance 522, by contact force of each of the hook bodies 542 applied to the contact inner surfaces 525, and by the hook heads 546 held in the holding surfaces 526. Accordingly, the left body 2A and the middle body 4 are maintained in a stable combination state without slight movement (a little movement due to loose coupling) and separation from each other.

The left coupling means and the right coupling means are different from each other in applied positions, but they are the same or similar to each other in terms of configuration. Accordingly, description of each of the female coupling part 52B and the male coupling part 54B of the right coupling means will be omitted.

The lower surface of the middle body 4 is arranged to be positioned at the same height as the height of each of a lower surface of the left body 2A and a lower surface of the right body 2B. Accordingly, the height adjustment pillow according to the embodiment of the present invention can be stably and conveniently used even at an even place. (see FIGS. 11A and 11B)

A plate is provided as the middle body 4, and the upward and downward directional height of the middle body is configured to be lower than the lowest height of the upper member 20A, 20B of each of the left body 2A and the right body 2B. That is, the middle body 4 is configured to have a thickness corresponding to a height lower than the lowest height of the upper member 20A, 20B of the left body 2A and the right body 2B. Accordingly, the height adjustment pillow according to the embodiment of the present invention can provide a pillow height lower than the height of each of the left body 2A and the right body 2B to a user.

In FIG. 2, although only one pillow cushion 6 is provided and is illustrated to have a size to be arranged on the upper portions of the left body 2A, the right body 2B, and the middle body 4, the pillow cushion 6 may be configured to be independently arranged on the upper portion of each of the left body 2A, the right body 2B, and the middle body 4. The pillow cushion 6 may be configured to have a shape in which the circumferential part of each of the left body 2A and the right body 2B can be covered since the manipulation handle 334 is mounted to each of the lower part of the left body 2A and the lower part of the right body 2B. Of course, the pillow cover can be easily manufactured to have the shape to cover a circumferential part of each of the left body 2A and the right body 2B.

In FIGS. 2 and 3, a reference numeral 4h refers to a linking ring, and one or two or more linking rings 4h may be provided in each of the upper member 20A and 20B of the left body 2A and the right body 2B as well as in the middle body 4. Although not shown, the pillow cushion 6 includes a connecting band provided therein, wherein the connecting band is hooked on and connected to each of the linking rings 4h. The connecting band may be an elastic band.

When the pillow cushion 6 is arranged on the upper part of each of the left body 2A, the right body 2B, and the middle body 4, and the connecting band is hooked on the linking ring 4h, the pillow cushion 6 is coupled to the pillow base (see reference numerals 2A, 2B and 4 of FIG. 2).

Although the present invention has been described above, the present invention is not limited to the disclosed embodiment and the accompanying drawings and may be variously modified by those skilled in the art without departing from the technical spirit of the present invention. In addition, according to the embodiment according to the technical idea of the present invention, each of the components of the present invention may be implemented independently, or two or more components may be implemented in combination with each other. For example, as described above, the left body 2A and the right body 2B are connected to each other by the middle body 4 to constitute the height adjustment pillow, but each of the left body 2A and the right body 2B may be used as an independent height adjustment pillow.

What is claimed is:

1. A height adjustment pillow comprising:

a left body (2A) and a right body (2B) arranged at an interval so as to be spaced apart from each other; and an elastic middle body (4) connecting the left body (2A) with the right body (2B) therebetween and capable of being elastically transformed, wherein at least any one of the left body (2A) and the right body (2B) comprises:

a lower member (10A, 10B);

an upper member (20A, 20B) arranged on the lower member (10A, 10B); and a lifting device (30A, 30B) adjusting a height of the upper member (20A, 20B) with respect to the lower member (10A, 10B) by moving the upper member (20A, 20B) up and down, wherein the lifting device (30A, 30B) comprises:

a drive shaft (330) arranged in the upward and downward directions by passing through the lower member (10A, 10B) with a lower end part (332) thereof protruding from a lower part of the lower member (10A, 10B) and having a manipulation handle (334) provided in the protruding lower end part (332);

at least one or more rotation members (320) mounted to an upper part of the lower member (10A, 10B) to be rotatable relative to upward and downward directional shafts thereof in adjacent areas of the drive shaft (330);

a power train (380) transmitting a rotational force of the drive shaft (330) to the rotation members (320); and a lifting operation equipment (360, 370) converting a rotational movement of the rotation member (320) into a rectilinear movement of the upward and downward directions proportional to a rotation angle of the rotation member (320) with respect to the upper member (20A, 20B) so as to lift and lower the upper member (20A, 20B), wherein a receiving groove part (12A, 12B) is provided in the lower part of the lower member (10A, 10B) to receive the lower end part (332) and the manipulation handle (334), wherein the power train (380) is a geared power train comprising a drive gear (382) mounted to the drive shaft (330) and a driven gear (384) mounted to the same shaft as a shaft of the rotation member (320), wherein the teeth number of the drive gear (382) is smaller than the teeth number of the driven gear (384), wherein the power train (380) further comprises an idler gear (386) provided between the drive gear (382) and the driven gear (384) to be engaged with the drive gear (382) and the driven gear (384), wherein the teeth number of the idler gear is larger than the teeth number of the drive gear (382) and smaller than the teeth number of the driven gear (384).

2. The pillow of claim 1, further comprising:

a height indication device (70) indicating the height of the upper member (20A, 20B) according to a rotational angle of the rotation member (320).

3. The pillow of claim 2, wherein the height indication device (70) comprises:

a first gear (72) mounted to the same shaft as the shaft of the rotation member (320);

a second gear (74) mounted rotatably to the lower end part (332) protruding from the lower part of the lower member (10A, 10B), received in the receiving groove part (12A, 12B), rotated by a rotational force of the first gear (72), and having the same pitch circle and gear teeth number as a pitch circle and a gear teeth number of the first gear (72); and an indication member (78) mounted to the second gear (74) and having an indication part to indicate the height of the upper member (20A, 20B).

4. The pillow of claim 1, wherein the lower member (10A) of the left body (2A) and the lower member (10B) of the right body (2B) are provided with one or more female coupling parts (52A, 52B) in each of parts opposed to each other, and a male coupling part (54A, 54B) with which each of the female coupling part (52A) of the left body (2A) and the female coupling part (52B) of the right body (2B) is combined is provided at each of a left end part and a right end part of the middle body (4).

* * * * *